United States Patent Office 2,769,934
Patented Nov. 6, 1956

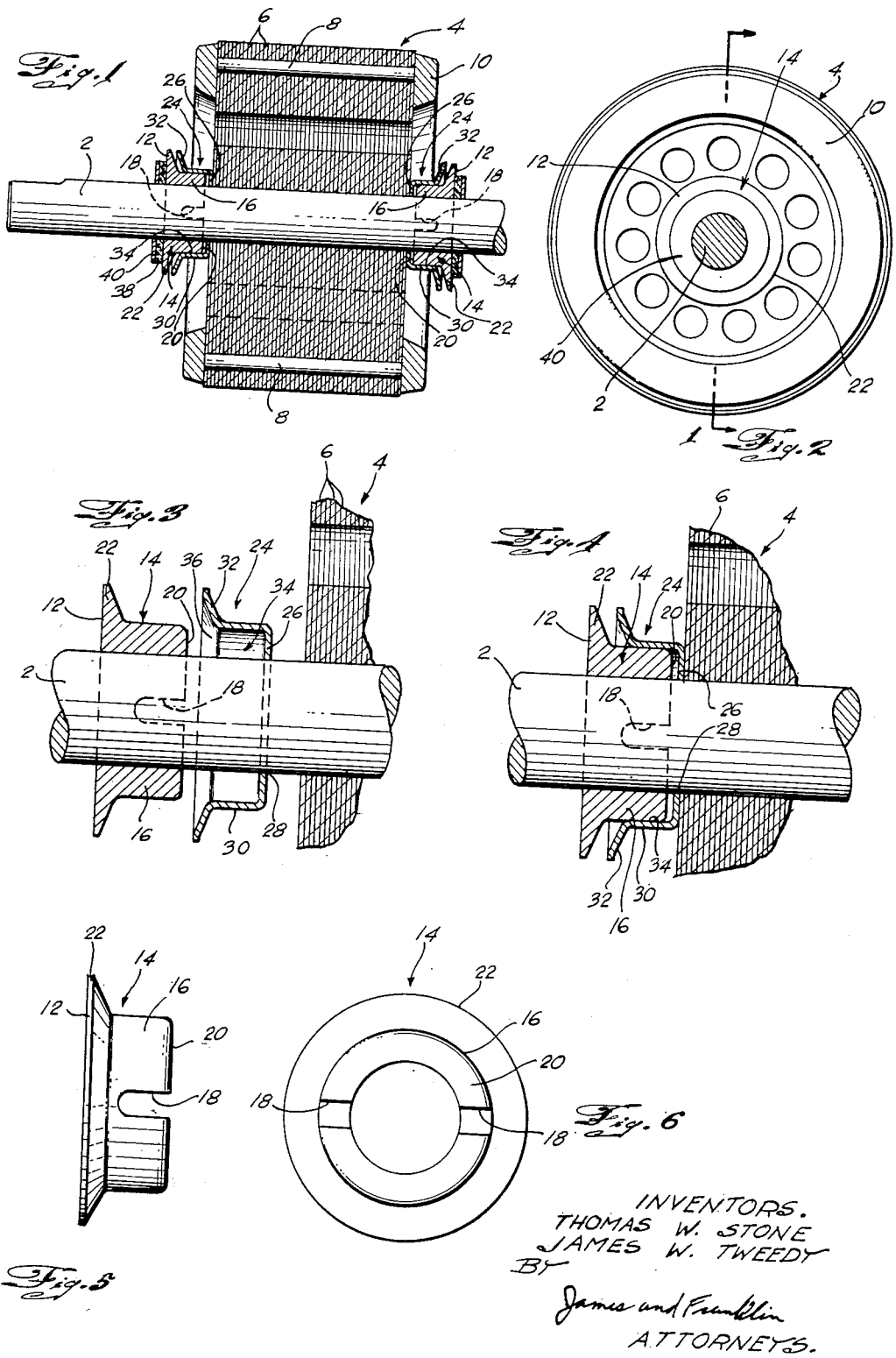
Nov. 6, 1956
T. W. STONE ET AL
2,769,934
ROTOR CONSTRUCTION, PARTICULARLY FOR USE IN ELECTRIC MOTORS
Filed Aug. 16, 1955
INVENTORS.
THOMAS W. STONE
JAMES W. TWEEDY
BY
James and Franklin
ATTORNEYS.

2,769,934

ROTOR CONSTRUCTION, PARTICULARLY FOR USE IN ELECTRIC MOTORS

Thomas W. Stone and James W. Tweedy, Owosso, Mich., assignors to Redmond Company, Inc., Owosso, Mich., a corporation of Michigan Application August 16, 1955, Serial No. 528,714

16 Claims. (Cl. 310—261)

The present invention relates to an arrangement by means of which parts may be positioned on a shaft so as to provide accurately spaced bearing surfaces thereon. The invention is particularly adapted for use in connection with the rotors of electric motors, in which case thrust bearing surfaces are provided and oil "slinger" structures are also formed.

In production, particularly in the case of fractional horsepower motors, it is a difficult problem to locate the thrust bearing surfaces so that the rotor will have only the desired degree of end play. Even when the thrust bearing surfaces are initially accurately positioned, the use or abuse to which the rotor shaft may be subjected will often tend to cause displacement of the thrust bearing surfaces. For example, if the rotor shaft is subjected to a strong axially directed shock force, as if a fan or blower wheel is driven onto the shaft extension of the motor, it will often be sufficient to dislodge or damage the structural element on the shaft which carries the thrust bearing surface. In addition, and again particularly in connection with electric motors, the shafts are usually provided with devices adapted to catch any lubricant which escapes from a shaft bearing and, centrifugally, to direct that lubricant back into the bearing. These devices, often called "oil slingers," are defined by structural parts which perform no function other than that associated with the lubricant.

The prime object of the present invention is to devise an arrangement in which, without requiring a costly machining operation on the assembled rotor unit, the thrust bearing surfaces on the shaft for a motor rotor or the like may be accurately positioned and spaced from one another. It is a further prime object of the present invention to devise a construction in which the component parts of the assembly need not be manufactured to any particular degree of accuracy, and in which assembly of the parts may readily be accomplished on a production line basis. Once the parts are assembled with the thrust bearing surfaces in proper spatial relationship, they will retain that relationship even though subjected to appreciable dislocative forces.

A secondary object of the present invention is to so construct the assembled parts that both of them will function as oil slingers, thus eliminating the necessity for a separate element to perform that function or, alternatively viewed, to modify the construction of the oil slinger so that it, in combination and cooperation with the element which carries the thrust bearing surface, will produce a unitary structure performing both the thrust bearing and oil slinging functions.

To these ends, the element which carries the thrust bearing surface is normally fairly freely slidable over the shaft and has a part which may be more or less readily radially collapsed, that part being adapted to be telescoped within a portion of a second member on the shaft, the outer diameter of the element part normally being somewhat greater than the inner diameter of the member portion into which it is telescoped. When the element part is telescoped within the member portion that part will be radially constricted so as to firmly grip the shaft and at the same time be firmly connected to the member into which it is telescoped. Considerable leeway is provided with respect to the axial extent of the telescoped parts so that the position along the shaft of the thrust bearing surface carried by the element can be varied within wide limits. Appreciable force is required to accomplish the telescoping, the magnitude of that force being greater than most of the axial dislocative forces to which the shaft may be subjected in use. The member into which the element is telescoped may be provided with a flaring portion positioned axially inwardly of the thrust bearing surface carried by the element, that flaring portion being capable of functioning as an oil slinger.

To the accomplishment of the above, and to such other objects as may hereinafter appear, the present invention relates to the construction and arrangement of a rotor assembly, and particularly a rotor assembly for use in an electric motor, as defined in the appended claims and as described in this specification, taken together with the accompanying drawings, in which:

Fig. 1 is a cross sectional view of an electric motor rotor assembly illustrating the present invention, taken along the line 1—1 of Fig. 2;

Fig. 2 is an end view of the assembly of Fig. 1;

Fig. 3 is a fragmentary view of one end of the assembly of Fig. 1 with the member and element shown in their initial positions on the shaft, before they have been telescoped;

Fig. 4 is a view similar to Fig. 3 but with the member and element in their telescoped finally assembled positions;

Fig. 5 is a side elevational view of the element which carries the thrust bearing surface; and Fig. 6 is an end elevational view thereof taken from the right hand side of Fig. 4.

The rotor assembly as here specifically disclosed is for use in a fractional horsepower induction motor. It comprises a shaft 2 on which is mounted a rotor core generally designated 4 and comprising a stack of laminations 6 having conductors 8 extending longitudinally therethrough adjacent the periphery thereof, the conductors being connected at their ends by means of rings 10 of conductive material. The core 4 is secured to the shaft 2 in any appropriate manner so as to rotate therewith.

In connection with a rotor of this type means must be provided on the shaft adapted to cooperate with suitable bearings or surfaces on the housing in which the rotor is to be mounted, so that the rotor will maintain its proper axial position relative to the stator. Since the rotor shaft 2 must be mounted for ready rotation, lubrication of the shaft bearings must also be provided. Some lubricant will tend to escape axially inwardly from the bearings along the shaft 2, and consequently "oil slingers" are usually provided for catching the lubricant which thus leaks along the shaft 2 and directing it back toward the bearings.

In accordance with the present invention means are provided for accomplishing these ends, to wit, providing a thrust bearing surface which, in cooperation with the stator, will accurately and reliably locate the rotor axially, and providing an "oil slinger," both by means of a unitized structure.

The primary problem involved in providing thrust bearing surfaces on rotors of the type under discussion is to have those thrust bearing surfaces properly spaced from one another and to ensure that they maintain proper spacing. In accordance with the present invention, the thrust bearing surfaces, designated 12, are defined by the axially outer surfaces of elements generally designated 14 which are slidable along the shaft 2. Those elements comprise a tubular part 16 having an internal diameter which is somewhat slightly greater than the diameter of the shaft 2, slots 18 extending radially through the part 16 and extending from the axially inner end 20 thereof partway along the length thereof. The axially outer portion of the element 14 flares outwardly, as at 22, so that the axially outer surface 12 thereof is of appreciable extent. The element 14 may be formed of any substantially rigid material, such as powdered iron, and the provision of the slots 18 in the tubular part 16 thereof renders that tubular part radially collapsible. The axially outer surfaces 12 are perpendicular to the shaft 2.

A cup-like member 24 is also provided, that member comprising an axially inner wall 26 substantially perpendicular to the shaft 2 and having an aperture 28 through which the shaft 2 may pass, a side wall 30 extending axially outwardly from the outer periphery of the inner wall 26 so as to be spaced from the shaft 2 and substantially parallel thereto, and a radially outwardly flaring outer wall 32. The space between the shaft 2 and the side wall 30, generally designated 34, is adapted to receive the tubular part 16 of the element 4 in telescoped relationship, that tubular part 16 entering the space 34 via a mouth 36 opening axially outwardly therefrom.

The normal outer diameter of the tubular part 16 is somewhat greater than the inner diameter of the side wall 30 of the member 24. In addition, the inner surface of the side wall 30 of the member 24 may be slightly tapered radially and axially inwardly. For example, the internal diameter of the side wall 30 may be .763 inch with a .010 inch taper, while the normal outer diameter of the tubular part 16 of the element 14 may be .781 inch, so that a radial difference of .009 inch is defined therebetween.

The member 24 may be formed of any appropriate structurally strong material, such as steel, zinc-plated to reduce the possibility of corrosion.

In assembling the parts they are first positioned as shown in Fig. 3, the member 24 being slid over the shaft 2 to a point adjacent the rotor core 4 and the element 14 being slid over the shaft 2 and moved axially inwardly toward the member 24. When assembly is actually to take place the element 14 is forced axially inwardly in any appropriate manner. It will engage with the member 24 and move that member along with it to the right as viewed in Fig. 3 (this being the axially inward direction for the left hand side of the assembly) until the inner wall 26 of the member 24 engages the rotor core 4. At this point the member 24 cannot move any farther. The application of continued pressure of suitable magnitude on the element 14 will therefore cause the element 14 to telescope into the member 24, the tubular element part 16 sliding into the space 34 via the open mouth 36. Sufficient pressure is applied for this telescoping action to continue until the axially outer surface 12 of the element 14 is spaced to precisely the desired degree from the laminations 6. During this telescoping movement the tubular part 16 of the element 14 will be compressed radially, because its normal outer diameter is, as has been related, slightly less than the inner diameter of the space 34. As a result the element 14 will be forced into a very firm frictional grip with the shaft 2, and will also very strongly frictionally grip the member 24 itself.

This operation is performed at each end of the rotor core 4 until the outer surfaces 12 of the elements 14 at each end of the core 4 are spaced from one another to precisely the desired degree.

As may clearly be seen from Fig. 4, the length of the tubular part 16 of the element 14 is somewhat greater than the length, axially, of the space 34. As a result considerable leeway is provided with respect to the extent to which the tubular part 16 may be telescoped within the member 24. As will be apparent, the structural elements and parts need not be manufactured to any great degree of precision. The only critical shape consideration is that the surfaces 12 should be perpendicular to the shaft 2. Nevertheless the thrust bearing surfaces 12 may be very accurately axially positioned relative to one another. It will also be understood that by the very act of assembling the element 14 and the member 24 those two parts will be rigidly connected to one another to the shaft 2 for simultaneous rotation. The outwardly flaring end wall 32 of the member 24 will function as an "oil slinger" in conventional fashion, and the fact that the member 24 is firmly secured to the element 14, and through it to the shaft 2, will ensure that it will rotate rigidly with the shaft 2 and thus impart the desired centrifugal "sling" to any lubricant which may be caught thereby. The radially extending surface 12 of the element 14 will also assist in the "oil slinging" operation.

After the elements 14 have been accurately positioned, washers 38 and 40 may be slid over the shaft 2 and up to the axially outer surfaces 12 thereof, the washer 38 being formed of cork and the washer 40 being formed of steel, all as is conventional.

The force required to cause the element 14 to telescope within the member 24 is usually greater than any forces to which the rotor assembly may be subjected during use. Forces of this magnitude may readily be generated in presses which can be used on the production line. As a result the relative position of the element 14 with respect to the rotor core 4 will be reliably fixed, the elements 14 remaining in their assembled position despite the usual use or abuse to which the rotor shaft may be subjected after assembly. Nevertheless, the parts of the assembly may be assembled accurately and expeditiously on a production line basis.

While but a single embodiment of the present invention has been here shown, and while the invention has been specifically illustrated in use in a rotor assembly for a fractional hosepower induction motor, it will be apparent that the invention is susceptible of much more general applicability, and that many variations may be made in the specifically disclosed features, all within the spirit of the invention as defined in the following claims.

We claim:

1. In combination, a shaft, a member on said shaft and having a portion radially spaced from said shaft to define a space therebetween having an axially outwardly oriented opening, and an element slidable over said shaft and having a radially collapsible part telescopable within the space between said shaft and said member portion via said opening, the normal outer diameter of said element part being greater than the inner diameter of said member portion, whereby telescoping of said element within said member causes said element to contract radially and grip said shaft and causes said member to be connected to said element, said member comprising an inner wall substantially perpendicular to and slidable over said shaft, a side wall of appreciable length extending axially outwardly from said inner wall substantially parallel to and spaced from said shaft to define said member portion, and an outer wall flaring radially outwardly from the outer end of said side wall, said outer wall permitting said member to function as an oil slinger.

2. In combination, a shaft, a member on said shaft and having a portion radially spaced from said shaft to define a space therebetween having an axially outwardly oriented opening, and an element slidable over said shaft and having a radially collapsible part telescopable within the space between said shaft and said member portion via said opening, the normal outer diameter of said element part being greater than the inner diameter of said member portion, whereby telescoping of said element within said member causes said element to contract radially and grip said shaft and causes said member to be connected to said element, said element part being tubular, of appreciable length, and received over said shaft, the normal internal diameter of said part being slightly larger than the diameter of said shaft and the normal outer diameter of said part being greater than the inner diameter of said member portion, said part having slots therethrough extending axially outwardly from the inner end thereof for a fraction of the length thereof, the axially outer surface of said element being substantially perpendicular to said shaft, the length of said part being at least equal to the length of said member, the axially outer portion of said element having a greater outer diameter than said tubular part and being positioned axially outwardly beyond said member.

3. In combination, a shaft, a member on said shaft and having a portion radially spaced from said shaft to define a space therebetween having an axially outwardly oriented opening, and an element slidable over said shaft and having a radially collapsible part telescopable within the space between said shaft and said member portion via said opening, the normal outer diameter of said element part being greater than the inner diameter of said member portion, whereby telescoping of said element within said member causes said element to contract radially and grip said shaft and causes said member to be connected to said element, said element being formed of powdered metal and comprising a tubular part of appreciable length received over said shaft and defining the aforementioned element part, the normal internal diameter of said part being slightly larger than the diameter of said shaft and the normal outer diameter of said part being greater than the inner diameter of said member portion, said part having slots therethrough extending axially outwardly from the inner end thereof for a fraction of the length thereof, the axially outer surface of said element being substantially perpendicular to said shaft, the length of said part being at least equal to the length of said member, the axially outer portion of said element having a greater outer diameter than said tubular part and being positioned axially outwardly beyond said member.

4. In combination, a shaft, a member on said shaft and having a portion radially spaced from said shaft to define a space therebetween having an axially outwardly oriented opening, and an element slidable over said shaft and having a radially collapsible part telescopable within the space between said shaft and said member portion via said opening, the normal outer diameter of said element part being greater than the inner diameter of said member portion, whereby telescoping of said element within said member causes said element to contract radially and grip said shaft and causes said member to be connected to said element, said element being formed of powdered metal and comprising a tubular part of appreciable length received over said shaft, the normal internal diameter of said tubular part being slightly larger than the diameter of said shaft and the normal outer diameter of said tubular part being greater than the inner diameter of said member portion, said part having slots therethrough extending axially outwardly from the inner end thereof for a fraction of the length thereof, the axially outer surface of said element being substantially perpendicular to said shaft.

5. The combination of claim 1, in which said element part is tubular, of appreciable length, and is received over said shaft, the normal internal diameter of said part being slightly larger than the diameter of said shaft and the normal outer diameter of said part being greater than the inner diameter of said member portion, said part having slots therethrough extending axially outwardly from the inner end thereof for a fraction of the length thereof, the axially outer surface of said element being substantially perpendicular to said shaft, the length of said part being at least equal to the length of said member.

6. The combination of claim 1, in which said element is formed of powdered metal and comprises a tubular part of appreciable length received over said shaft and defining the aforementioned element part, the normal internal diameter of said part being slightly larger than the diameter of said shaft and the normal outer diameter of said part being greater than the inner diameter of said member portion, said part having slots therethrough extending axially outwardly from the inner end thereof for a fraction of the length thereof, the axially outer surface of said element being substantially perpendicular to said shaft, the length of said part being at least equal to the length of said member.

7. A rotor for an electric motor comprising, in combination, a shaft, a rotor core thereon adapted to cooperate with an appropriate motor stator, a member on said shaft operatively engaging an end of said core and having a portion radially spaced from said shaft to define a space therebetween having an opening oriented axially outwardly from said core, and an element slidable over said shaft and having a radially collapsible part telescoping into said space between said shaft and said member portion via said opening, the normal outer diameter of said element part being greater than the inner diameter of said member portion, whereby telescoping of said element within said member causes said element to contract radially and grip said shaft and causes said member to be connected to said element.

8. The combination of claim 7, in which the axially outer surface of said element is substantially perpendicular to said shaft and extends out beyond the axially outer surface of said member.

9. The combination of claim 8, in which said member has a flaring mouth axially outwardly disposed with respect to the portion of said member into which said element telescopes.

10. The combination of claim 7, in which said member has a flaring mouth axially outwardly disposed with respect to the portion of said member into which said element telescopes.

11. The combination of claim 7, in which said member comprises an inner wall substantially perpendicular to and slidable over said shaft, a side wall of appreciable length extending axially outwardly from said inner wall substantially parallel to and spaced from said shaft to define said member portion, and an outer wall flaring radially outwardly from the outer end of said side wall, said outer wall permitting said member to function as an oil slinger.

12. The combination of claim 11, in which said element part is tubular, of appreciable length, and is received over said shaft, the normal internal diameter of said part being slightly larger than the diameter of said shaft and the normal outer diameter of said part being greater than the inner diameter of said member portion, said part having slots therethrough extending axially outwardly from the inner end thereof for a fraction of the length thereof, the axially outer surface of said element being substantially perpendicular to said shaft, the length of said part being at least equal to the length of said member.

13. The combination of claim 11, in which said element is formed of powdered metal and comprises a tubular part of appreciable length received over said shaft and defining said aforementioned element part, the normal internal diameter of said part being slightly larger than the diameter of said shaft and the normal outer diameter of said part being greater than the inner diameter of said member portion, said part having slots therethrough extending axially outwardly from the inner end thereof for a fraction of the length thereof, the axially outer surface of said element being substantially perpendicular to said shaft, the length of said part being at least equal to the length of said member.

14. The combination of claim 7, in which said element part is tubular, of appreciable length, and is received over said shaft, the normal internal diameter of said part being slightly larger than the diameter of said shaft and the normal outer diameter of said part being greater than the inner diameter of said member portion, said part having slots therethrough extending axially outwardly from the inner end thereof for a fraction of the length thereof, the axially outer surface of said element being substantially perpendicular to said shaft, the length of said part being at least equal to the length of said member, the axially outer portion of said element having a greater outer diameter than said tubular part and being positioned axially outwardly beyond said member.

15. The combination of claim 7, in which said element is formed of powdered metal and comprises a tubular part of appreciable length received over said shaft and defining the aforementioned element part, the normal internal diameter of said part being slightly larger than the diameter of said shaft and the normal outer diameter of said part being greater than the inner diameter of said member portion, said part having slots therethrough extending axially outwardly from the inner end thereof for a fraction of the length thereof, the axially outer surface of said element being substantially perpendicular to said shaft, the length of said part being at least equal to the length of said member, the axially outer portion of said element having a greater outer diameter than said tubular part and being positioned axially outwardly beyond said member.

16. The combination of claim 7, in which said element is formed of powdered metal and comprises a tubular part of appreciable length received over said shaft, the normal internal diameter of said tubular part being slightly larger than the diameter of said shaft and the normal outer diameter of said tubular part being greater than the inner diameter of said member portion, said part having slots therethrough extending axially outwardly from the inner end thereof for a fraction of the length thereof, the axially outer surface of said element being substantially perpendicular to said shaft.

References Cited in the file of this patent

UNITED STATES PATENTS

| | | |
|---|---|---|
| 1,739,286 | Bronson | Dec. 10, 1929 |
| 2,524,027 | Blackmar | Oct. 3, 1950 |